United States Patent [19]
Severn

[11] Patent Number: 6,124,956
[45] Date of Patent: Sep. 26, 2000

[54] OPTICAL TRANSMITTER OUTPUT MONITORING TAP

[75] Inventor: John Kenneth Severn, Totnes, United Kingdom

[73] Assignee: Nortel Networks Limited, Montreal, Canada

[21] Appl. No.: 08/984,894

[22] Filed: Dec. 4, 1997

[51] Int. Cl.[7] .......................... H04B 10/00; H04B 10/04; H04B 10/08

[52] U.S. Cl. .............................. 359/110; 359/177; 385/48

[58] Field of Search ..................... 359/168, 173, 359/152, 177, 193, 187; 385/12, 48; 356/310; 372/48

[56] References Cited

U.S. PATENT DOCUMENTS

| | | | |
|---|---|---|---|
| 4,456,329 | 6/1984 | Henderson | 350/96.16 |
| 4,544,232 | 10/1985 | Laude | 350/96.15 |
| 4,799,795 | 1/1989 | Fateley | 356/310 |
| 4,981,335 | 1/1991 | Gaebe | 350/96.18 |
| 4,993,796 | 2/1991 | Kapany et al. | 350/96.15 |
| 5,146,516 | 9/1992 | Blumke | 385/36 |
| 5,781,347 | 7/1998 | Fukushima | 359/674 |
| 5,883,730 | 3/1999 | Coult et al. | 359/152 |
| 5,900,983 | 5/1999 | Ford et al. | 359/627 |

FOREIGN PATENT DOCUMENTS

| | | |
|---|---|---|
| 2 038 017 | 11/1982 | United Kingdom . |
| 2 312 346 | 4/1996 | United Kingdom . |

*Primary Examiner*—Jason Chan
*Assistant Examiner*—Agustin Bello
*Attorney, Agent, or Firm*—Lee, Mann, Smith, McWilliams, Sweeney & Ohlson

[57] ABSTRACT

An optical arrangement for full duplexed PON outstation transceivers (single fibber operation) which improves control of optical output power during marshalling by reducing the light level at which closed loop control can be used. The arrangement uses a beam-expanded region incorporating a bulk-optics beam-splitter with a reflective field stop that will tap a higher proportion of the basestation transmitter power when it is operating below lasing threshold and hence has a larger beam size than when operating above threshold.

8 Claims, 3 Drawing Sheets

OPTICAL TRANSMITTER OUTPUT MONITORING TAP

BACKGROUND OF THE INVENTION

This invention relates to the monitoring of the optical output of a transmitter by means of an optical tap located in the transmission path. It finds particular application in respect of transmitters required to operate with a wide dynamic range of optical output power, such as is liable to occur in the outstations of a TDMA (time division multiple access) system that employs a non-serial form of marshalling. In such a system a plurality of outstations communicate with a basestation on a TDMA basis while the basestation may communicate with its outstations on a broadcast basis. To operate such a system there is a fundamental requirement that the system shall be able to measure, and then equalise, the propagation delays on the different spurs linking the different outstations with the basestation. This measurement can be made by transmitting signals at normal power from each of the outstations to the basestation, and noting the time of receipt of those signals. However, in a practical system the uncertainty in this time occasioned by the different propagation delays means that a substantial period of potential transmission time in the upstream (outstation to basestation) direction needs to be reserved for the receipt of these signals. This method is referred to as 'serial marshalling' since it can not be carried out simultaneously with the upstream transmission of data traffic. In the case of non-serial marshalling, an initial marshalling procedure involves the use of transmissions at power levels too low to have significant affect upon normal data traffic, so that these initial marshalling transmissions can therefore be transmitted in parallel with that data traffic. This involves the outstation transmitting a pseudo-random bit sequence which is detected at the basestation by cross-correlation. Such an initial marshalling method is for instance described in U.S. Pat. No. 5,528,596.

The optical source of an outstation is provided by a directly modulated semiconductor laser chip and, because the electro-optic conversion efficiency of such a device varies with temperature and with the effects of ageing, it is conventional practice to regulate its optical power output with the aid of a feedback control loop, deriving a feedback control signal from the photocurrent produced by a monitor photodetector positioned to intercept a part of the laser's emission. An example of such a TDMA transmitter is for example to be found in United Kingdom Patent Application No GB 2 312 346 A.

When initial marshalling commences, the output power of the outstation's laser chip must, under the least favourable conditions, be low enough to avoid producing unacceptably high corruption of data being simultaneously transmitted to the basestation from any other outstation. Typically this transmission will be at a power level too low for the cross-correlation performed at the basestation to detect it. The power level of the transmission must then be incremented in steps until it is large enough to be detected. The size of those steps is regulated on the one hand by the need to make them small enough for a single increment not to raise the power level from undetectable to datacorrupting, and on the other hand to make them large enough to ensure that detection will occur within a reasonably short time interval from the commencement of the initial marshalling.

Implicit in the foregoing is the fact that regulation of the drive applied to the outstation's laser chip in order to regulate the optical power output by that outstation is required, not only during data transmission, but also during the initial marshalling process, and that at least in the initial stages of the initial marshalling process, the optical output power of the outstation needs to be regulated to a power level very much lower than that employed during data transmission, typically commencing at a power level in the region of 40 dB below that of the data bits.

Typically regulation of the drive current applied to a semiconductor diode is achieved by means of a feedback control loop whose photocurrent is taken from a monitor photodetector positioned to receive light emitted from the back-facet of the laser chip. To attempt to use such a back-facet monitor photodetector for regulation that compasses such a dynamic range of drive current introduces the problem that, if the photodetector is sensitive enough to provide a photocurrent of sufficient magnitude for closed loop control of the laser drive current during the initial stages of initial marshalling, the it is very liable to saturate before the laser drive current is at the required level for subsequent data transmission. Alternatively, if the sensitivity of the photodetector is small enough to avoid saturation during data transmission, it is very liable to be too small to provide a photocurrent large enough for closed loop control during the initial stages of initial marshalling.

One way of circumventing the problem of having too low a light level, during at least the initial stages of initial marshalling is to create a lookup table that relates power output to drive current from calibration measurements made on a test jig before the laser is ever brought into service. (Such a test jig would derive its calibration from measurements made with its own photodetector rather than the monitor photodiode of the laser itself). Under these circumstances, due allowance can be made for the effects of temperature, but importantly not for those of ageing.

The absence of a means for making allowance for the effects of ageing gives rise to a magnitude of uncertainty in optical power level output for which due allowance must be made in the devising of the incremental power steps in a manner that avoids the risk of data corruption, and this in turn has the effect of lengthening the time taken to complete initial marshalling.

Reverting attention to general aspects of generating a monitoring signal for use in feedback control, it is typically found desirable to choose a system providing a linear relationship between the magnitude of the monitoring signal and the magnitude of the parameter being monitored.

If such a regime were to be employed for regulating the transmitter output power of an outstation using non-serial marshalling in which the initial marshalling power was required to be 40 dB below that required for the transmission of data, then the corresponding monitor signal during initial marshalling would similarly be 40 dB below that pertaining during the transmission of data. In fact however a back-facet monitor typically provides a response that is somewhat more favourable than a linear response.

This can be seen from measurements performed in respect of a system as depicted in FIG. 1. This system has a laser diode 10 provided with a back-facet monitor photodiode 11. The main output of the laser diode 10 is coupled into one end of a length 12 of single mode optical fibber. The light emerging from the far end of the fibre 12 is optically coupled into an optical power meter 13. In FIG. 2, curve 20 shows how the monitor current provided by the monitor diode 10 varies as a function of power output delivered to meter 13. At low output power levels in the region of 0.5 $\mu$W delivered to the power meter 13 by the fibre 12, monitor efficiency is in the region of 1.3 µA/µW, falling off to about 1.0 µA/µW at an output power of about 1 µW, and then falling off further at higher power output levels to an asymptotic value less than 0.45 µA/µW. The reason for this non-linear efficiency characteristic is that the back-facet monitor photodiode can be expected to produce a photocurrent in substantially direct proportion to the total light output (both coherent and non-coherent) from the front facet of the laser diode; that the proportion of incoherent to coherent light emission falls with increasing power output from that forward facet; and that the coherent light is conveyed by the single mode fibre 12 with much less transmission loss than the conveyance of the incoherent light on account of the coherent light being emitted in a solid angle more nearly matched with the acceptance angle of the single mode fibber. If for instance a photocurrent of at least 1 mA were required for closed loop control of the laser drive current control, then it is seen that, as a result of this non-linearity, the feedback loop is operational down to a fibber output power in the region of 0.5 µW. In the absence of the nonlinearity, and assuming the efficiency value of 0.45 µA/µW in respect of coherent light, the corresponding figure is that the feedback loop would be operational only down as far as about 2.2 µW. Actually, an efficiency value of 0.45 µA/µW is impracticably large if the required signal traffic power level is in the region of 2 mW, for this would imply that the monitor photodiode be capable of delivering a photocurrent in excess of about 90 mA without saturating. Thus it is seen that, though the nonlinearity provided by the capture by a back-facet monitor of incoherent light provides a beneficial effect, a still greater non-linearity would be more useful.

SUMMARY OF THE INVENTION

An object of the present invention is to provide greater non-linearity.

An object of the present invention is also to provide an optical transmitter that incorporates a monitoring system for measuring the output of its semiconductor laser in a manner providing a large dynamic range.

Such a transmitter includes an optical output to which the semiconductor laser is optically coupled via an optical tap. This tap taps off a portion of the light emitted by the laser, and directs that tapped-off portion to a photodetector. The tap has a construction providing it with the property that it taps off a greater proportion of the incoherent light emitted by the laser than it does the coherent light emitted by that laser. This selectivity is accomplished through making use of the fact that the solid angle over which the laser emits coherent light is significantly different from that over which it emits incoherent light. Since the proportion of incoherent to coherent light in the output of the laser diminishes as that output is increased, the proportion of that output that is tapped-off by the tap is diminished as that output is increased. This means that the combination comprising the tap and a photodetector optically coupled with its tap output has an effective sensitivity that decreases with increasing laser output.

The selectivity of the tap may be effected by spatial filtering. Alternatively it may be effected by mode-selective coupling Other features and advantages of the invention will be readily apparent from the following description of preferred embodiments of the invention, the drawings and the claims.

DETAILED DESCRIPTION OF PREFERRED EMBODIMENTS

Figure 1:
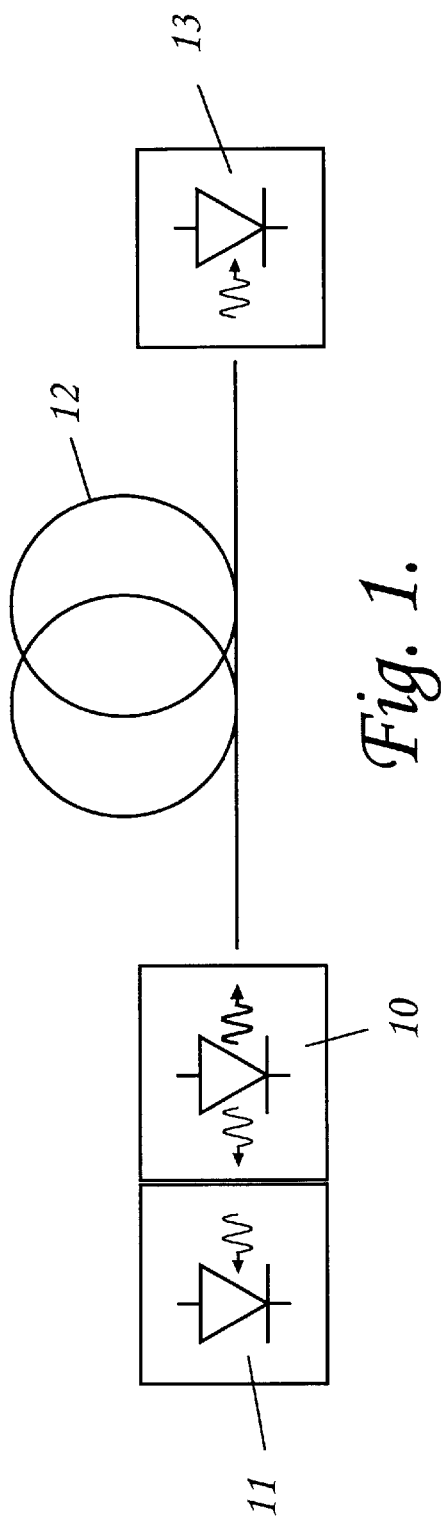
FIG. 1 is a schematic representation of apparatus employed for relating the power delivered into the guided mode of a single mode fibber from a semiconductor laser to the photocurrent generated by a back facet monitor.
Figure 2:
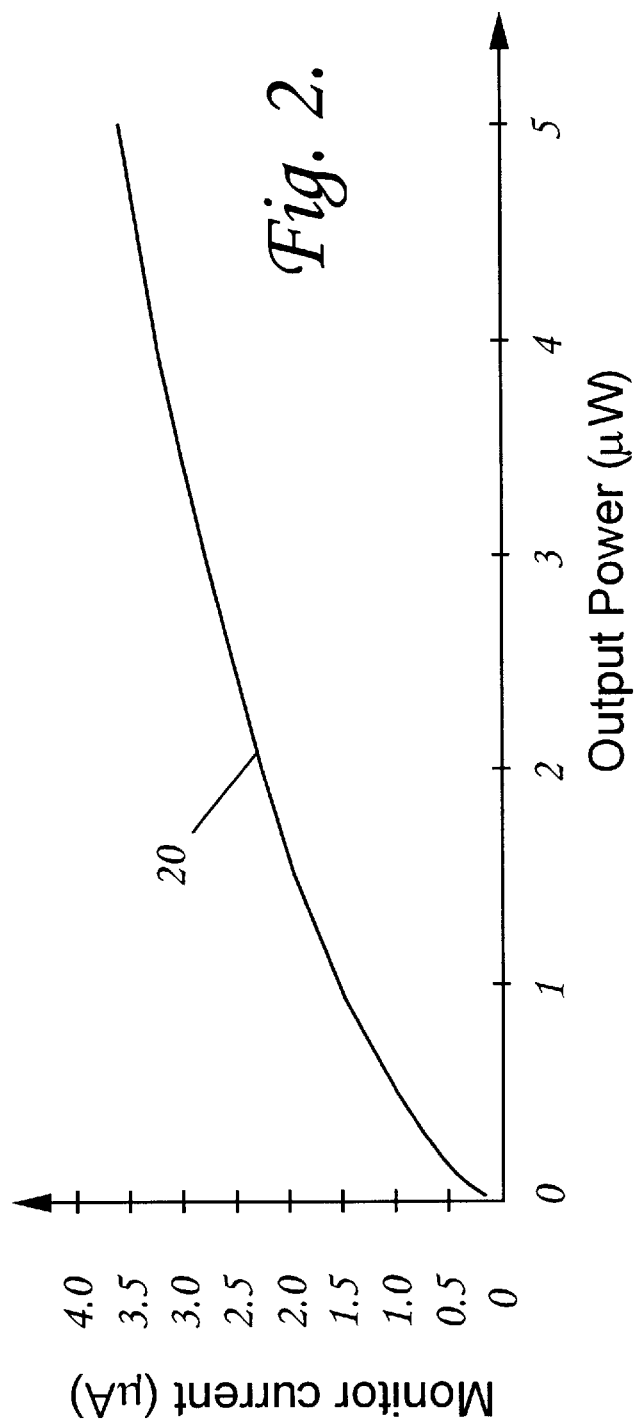
FIG. 2 is a graphical representation of the power/photocurrent relationship provided by the apparatus of FIG. 1, and FIGS. 3 and 4 are schematic representations of alternative forms of Passive Optical Network (PON) transceivers embodying the invention in alternative preferred forms.
Figure 3:
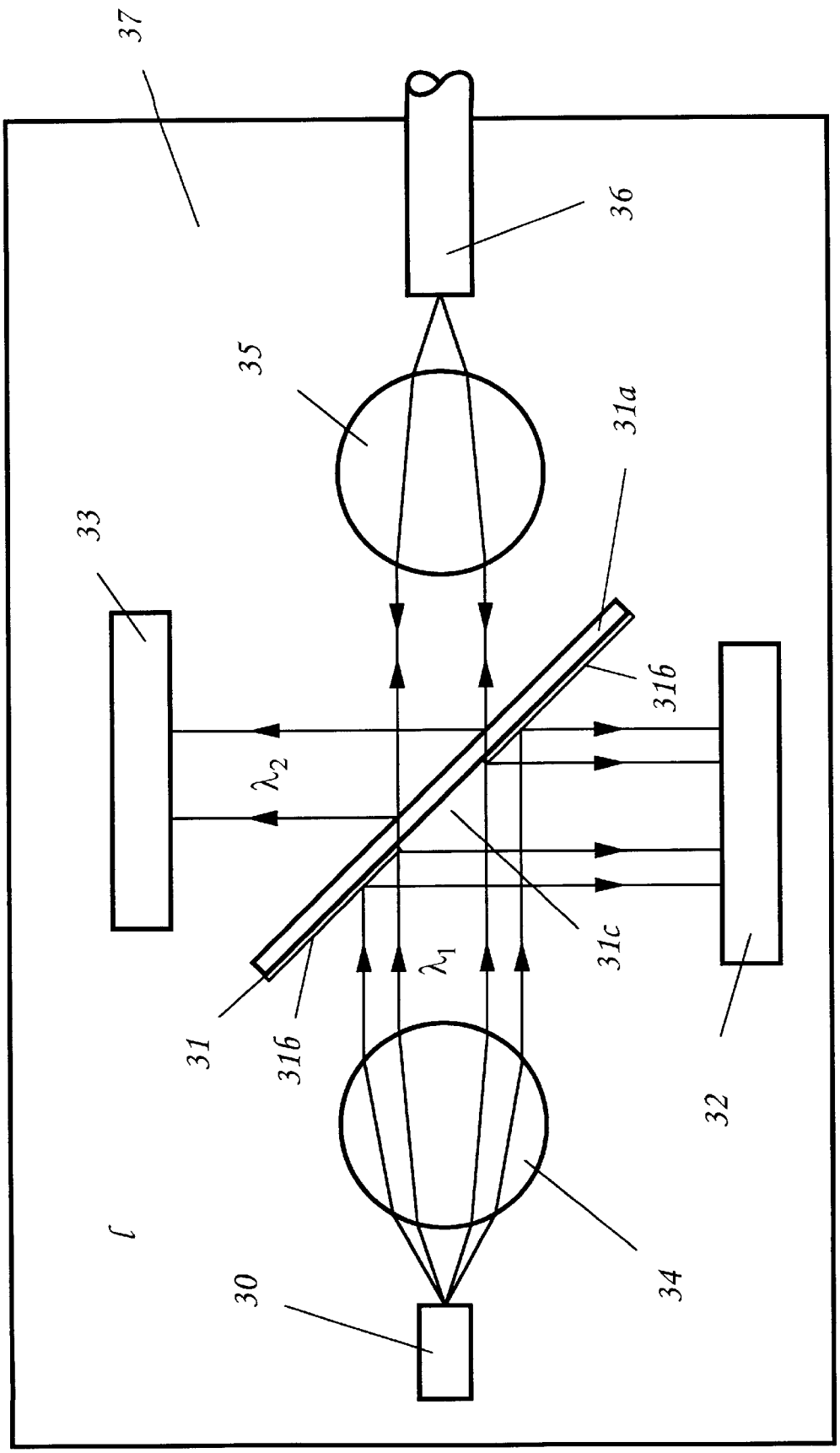

Referring to FIG. 3, at a Passive Optical Network outstation transceiver a semiconductor laser 30, and optical tap 31, first and second photodetectors 32 and 33, two collimating ball-lenses 34 and 35, and the end portion of an optical fibber 36 are secured to a substrate 37. Typically the substrate 37 is a silicon substrate provided with electrically conductive tracks (not shown) for making terminal connection with the laser and photodetectors, and also provided with an anisotropically etched V-groove (not shown) in which to locate the end portion of the optical fibber 36.

The laser 30 constitutes the transmitter of the transceiver, and light emitted by this laser is collimated by lens 34 before being obliquely incident upon the optical tap 31. The function of this tap is to transmit the majority of the light incident upon it for launching into the end of fibber 36, and to reflect, at least at high output power levels, only a small proportion on to the photosensitive surface of photodetector 32 in order to generate a photocurrent employed to regulate the magnitude of the drive current applied to the laser 30, and hence also that of the light emitted by that laser. The light from the laser 30 that is transmitted by the tap 31 is incident upon lens 35 which concentrates it for launching into the adjacent end of the fibber 36 for onward transmission to the basestation (not shown) of the system. In a full duplexed single fibber system, signals from,the basestation are received at the outstation by way of fibber 36. Light emerging from this fibber is collimated by lens 35 before being obliquely incident upon optical tap 31, at which reflection directs light on to photodetector 33, which constitutes the receiver of the outstation transceiver. Typically the outstation transceiver is required to transmit at one wavelength, $\lambda_1$, and to receive at a different wavelength, $\lambda_2$. Under these conditions the optical tap 31 may be composed in part by a dichroic filter 31a, which is nearly totally reflecting at wavelength $\lambda_2$ while exhibiting low reflectivity at wavelength $\lambda_1$.

As thus far described, the light from the laser that is tapped off by tap 31 and directed on to the photosensitive surface of monitoring photodetector 32 contains no mechanism to provide the desired property of tapping a greater proportion of the incoherent light emitted by the laser than of the coherent light. This property is provided through the agency of an apertured preferentially reflecting layer 31b. This layer 31b has a central aperture dimensioned so that the majority of the coherent light emitted by the laser 30, which is emitted over a smaller solid angle than that over which the non-coherent light emitted by the laser is emitted, is not intercepted by the reflecting layer 31b, but passes through dichroic filter 31a to be launched into fibber 36 after passing through lens 35. Depending upon geometry, most or substantially all of this light incident upon the end of fibber 36 is launched into it to propagate in its guided mode. The light which is intercepted by the reflecting layer 31b is reflected by it so as to be incident upon the photosensitive surface of photodetector 32 which, as explained previously, acts as a monitor photodetector providing an electrical output for regulating the optical output of the laser 30. At high light output levels, the emission of the laser diode 30 is predominately emission of coherent light. Most of this coherent light is emitted within the solid angle that causes it to pass through aperture 31c, and most or all of the coherent light that does pass through aperture 31c is launched into the guided mode of fibre 336. Correspondingly only a small proportion of the coherent light is intercepted by reflector 31b to be reflected by it on to the photosensitive surface of monitor photodetector 32. Because of the larger solid angle over which incoherent light is emitted, the ratio of optical power reaching the monitor photodetector 32 to that launched into the single guided mode of the fibber 36, the monitor tapping efficiency, is significantly greater for the incoherent light emitted by the laser than for the coherent light emitted by it.

At high overall power output levels of the laser diode 30 the proportion of incoherent emission to incoherent emission is so large that the overall (i.e. taking into account both coherent and incoherent light) monitor tapping efficiency asymptotically approaches the value pertaining for coherent light alone. As the power output level from the laser is reduced, the proportion of incoherent emission to coherent emission rises, and hence the overall monitor tapping efficiency is progressively increased towards the larger value pertaining for incoherent light alone, reaching this value when the laser drive is reduced below lasing threshold. Thus it is seen that the arrangement provides a non-linear relationship between the overall tapped power and the overall power launched into the guided mode of the single mode optical fibber whereby, as the power output of the laser is increased, the proportional increase in tapped power is smaller than the corresponding proportional increase in launched power. This in its turn means that the transmitter of the PON outstation can be operated with closed loop regulation over a dynamic range of launch power that is larger than the proportional difference between the saturation monitor power and the minimum monitor power required for closed loop control. The amount of the extension of dynamic range obtained in this way is determined empirically, and is adjustable by adjustment of the size reflectivity and shape of the aperture 31c.

In the PON outstation transceiver of FIG. 3 the selectivity of the tapping as between coherent and incoherent light emission from the laser 30 is effected by means of spatial filtering imposed by the aperture 31c in the reflecting layer 31b. An alternative approach to providing the requisite selectivity is by modal filtering. An example of such an approach is given in the PON outstation transceiver of FIG. 4 which uses a form of modal filtering employing a type of optical fibber directional coupler of the general form previously described GB 2 038 017 B. In describing the PON outstation transceiver of FIG. 4, components that perform the same function as corresponding components in the PON outstation transceiver of FIG. 3 are ascribed the same index numerals as those of their FIG. 3 counterparts.

Figure 4:
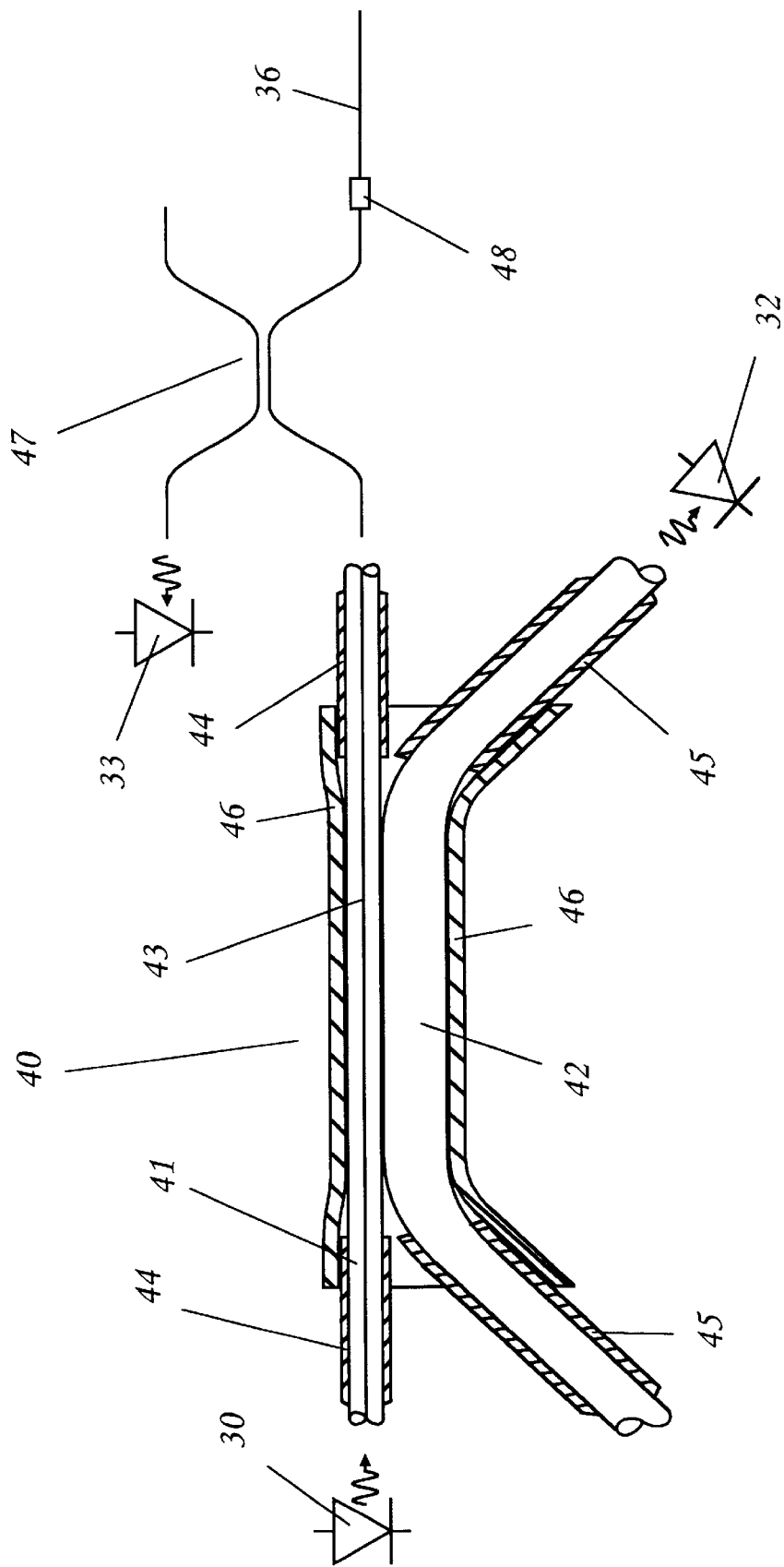

Referring now to FIG. 4, a laser 30 which constitutes the transmitter of the transceiver has its optical output optically coupled with a directional coupler indicated generally at 40. This coupler 40 is constructed from a pair of dissimilar optical fibres 41 and 42. Fibre 41 is a single mode silica glass fibber having a central doped silica core 43 and a plastics protective coating 44. Though described as a single mode fibre, the interface between the fibre 41 and its coating 44 is such as to guide, over short distances typically of no more than a metre of two, 'cladding' modes additional to the 'single' mode that is guided by the interface between the core 43 and the cladding glass that directly surrounds that core. Fibre 42 is a multimode fibre of glass or plastics material provided with a lower refractive index plastics coating 45 which functions as its optical cladding. A portion of the plastics coating 44 is removed from fibre 41, and a similar portion of plastics coating 45 is removed from fibre 42 so that with in this region the bare fibres 41 and 42 may be brought into intimate contact. Around this region of intimate contact the bare fibres 41 and 42 are encased in a lower refractive index plastics optical cladding 46. The refractive index of fibre 42 is made not less than that of the optical cladding of fibre 41 so that a substantial proportion of any power propagating in the cladding of fibre 41 is coupled across into fibre 42 to propagate in one or more of its core modes. The proportion of power coupled across in this way may be enhanced by choosing the cross-sectional area of fibre 42 to be greater than that of fibre 41 and also by enlarging the area of intimate contact between the two fibres. In the case where both fibres are made of glass, such enlargement can be effected by partially fusing them together. If the fibre 42 is made plastics material, then it is advantageous for this material to be relatively soft so that it s contour is at least partially moulded to that of fibre 41 by the outer cladding 46.

Directional coupler 40 is mode selective because optical power that is launched into fibre 41 to propagate in the single mode guided by the interface between its core 43 and the material directly surrounding that cored passes straight through the coupler without any portion of that power being coupled across to fibre 42 in the region of intimate contact between the two fibres. On the other hand, in respect of any optical power that is launched into fibre 41 to propagate in cladding modes that are guided by the interface between fibre 41 and the plastics coating 44 surrounding that fibre, a significant proportion is coupled across to fibre 42 in the region of intimate contact between it and fibre 41. Accordingly the ratio of optical power from laser 40 that emerges from the remote end of fibre 42 to that that emerges from the remote end of fibre 41 increases as the total power emitted by the laser is decreased because this decrease is accompanied by a decrease in the proportion of coherent to incoherent light emitted by that laser. In consequence, the optical fibre 36 is optically coupled with the remote end of fibre 41, and the monitor photosensor 32 is optically coupled with the remote end of fibre 42. The coupling of the fibre 41 with the fibre 36 is by way of a $\lambda_2/\lambda_2$ wavelength multiplexing 2×2 fibre coupler 47 arranged such that light of wavelength $\lambda_1$ from the laser 30 is coupled into fibre 36 by way of splice 48, while light of wavelength $\lambda_2$ from the basestation is coupled from fibre 36 by way of the splice 48 and wavelength multiplexing coupler 47 on 6o 6h4 photosensitive surface of photosensor 33.

The PON outstation transcievers of FIGS. 3 and 4 have been specifically constructed for operation under conditions in which outstation to basestation communication is at one wavelength, $\lambda_1$, while communication in the opposite direction is at a different wavelength, $\lambda_2$. However, by replacement of the dichroic filter 31a of FIG. 3 with a beam-splitting reflector (typically a 3 dB beam-splitting reflector), and by replacement of the wavelength multiplexing 2×2 fibre coupler 47 of fig. 4 with a beam-splitting 2×2 fibre coupler (typically a 3 dB 2×2 fibre coupler), these transceivers may be readily adapted for operation under conditions in which the same wavelength is employed for communication in both directions on the same fibre.

What is claimed is:

1. A process of extending the effective dynamic range of a monitoring system for monitoring the magnitude of optical power launched into a single mode optical waveguide from a semiconductor laser so as to propagate in the single mode of that fibre wave guide, wherein optical power for monitoring purposes is tapped from the optical power launched into the waveguide in a manner tapping a greater proportion of incoherent light emitted by the laser than of coherent light, thereby providing the tap with a tap efficiency, the ratio of tapped optical power to optical power launched into the single mode of the waveguide, that reduces with increasing magnitude of the optical power launched into the single mode of optical waveguide.

2. A process as claimed in claim 1, wherein said greater proportion of incoherent light than of coherent light is tapped by the use of a beam-splitter with an apertured preferentially reflecting region.

3. An optical transmitter which includes an optical output port to which a semiconductor laser is optically coupled via an optical tap feeding a monitor photodetector, wherein the optical tap is configured to tap a higher proportion of non-coherent light emitted by the laser than it taps coherent light emitted by the laser.

4. An optical transmitter as claimed in claim 3, wherein the optical tap includes a beam-splitter with an apertured preferentially reflecting region.

5. An optical transmitter as claimed in claim 3, wherein the optical tap includes a 2×2 optical fibre directional coupler constructed from a single mode fibre, additionally capable of supporting cladding modes and a multimode fibre, and having the property that light propagating in the single mode of the single mode fibre is not coupled with any core modes of the multimode fibre while light propagating in one or more cladding modes of the single mode fibre is coupled with one or more core modes of the multimode fibre.

6. A PON outstation transceiver incorporating an optical transmitter as claimed in claim 3.

7. A PON outstation transceiver incorporating an optical transmitter as claimed in claim 4.

8. A PON outstation transceiver incorporating an optical transmitter as claimed in claim 5.

* * * * *